(12) United States Patent
Deprez et al.

(10) Patent No.: US 11,710,012 B2
(45) Date of Patent: Jul. 25, 2023

(54) DIGITAL PRINTING PROCESS AND RESULTING PACKAGING MATERIAL (71) Applicant: XEIKON MANUFACTURING NV, Lier (BE)

(72) Inventors: Lode Erik Dries Deprez, Lier (BE); Jürgen Norbert Bart Devlieghere, Borgerhout (BE); Roel De Mondt, Rumst (BE); Romain Jan Victor Paul Van Der Gucht, Lint (BE); Tom Rik May Broeckx, Ramsel (BE)

(73) Assignee: XEIKON MANUFACTURING NV, Lier (BE)

( * ) Notice: Subject to any disclaimer, the term of this patent is extended or adjusted under 35 U.S.C. 154(b) by 0 days.

(21) Appl. No.: 17/788,054

(22) PCT Filed: Dec. 21, 2020

(86) PCT No.: PCT/EP2020/087485
§ 371 (c)(1),
(2) Date: Jun. 22, 2022

(87) PCT Pub. No.: WO2021/130177
PCT Pub. Date: Jul. 1, 2021

(65) Prior Publication Data
US 2023/0046338 A1 Feb. 16, 2023

(30) Foreign Application Priority Data
Dec. 23, 2019 (NL) .................... 2024561

(51) Int. Cl.
G06K 15/02 (2006.01)
B41M 5/00 (2006.01)
G06K 15/10 (2006.01)

(52) U.S. Cl.
CPC ....... *G06K 15/1807* (2013.01); *B41M 5/0047* (2013.01); *G06K 15/102* (2013.01); *G06K 15/1836* (2013.01)

(58) Field of Classification Search
CPC ............ G06K 15/1807; G06K 15/102; G06K 15/1836; B41M 5/0047; B41M 5/0017; B41M 3/008; B31B 50/88
See application file for complete search history.

(56) References Cited

U.S. PATENT DOCUMENTS 6,566,024 B1 * 5/2003 Bourdelais ............. G03C 11/08
430/536
2007/0002119 A1 * 1/2007 Abrott ..................... B41J 3/407
347/105

FOREIGN PATENT DOCUMENTS

EP 3248794 A1 11/2017
EP 3354580 A1 8/2018

OTHER PUBLICATIONS

International Search Report and Written Opinion for PCT/EP2020/087485, dated Apr. 16, 2021 (15 pages).
(Continued)

*Primary Examiner* — King Y Poon
*Assistant Examiner* — Michael L Burleson
(74) *Attorney, Agent, or Firm* — KDW Firm PLLC (57) ABSTRACT A digital printing process for printing an image (I) including a white area (W) and/or a coloured area (C) on a packaging material includes selecting a packaging material with a substantially white side, and preparing print data to be sent to a printing means taking into account that the side of the packaging material is substantially white. The print data represents one or more first image areas (A1) representing the image (I), and one or more second image areas (A2) representing a packaging look (L), to be printed on the substantially white side of the packaging material, outside
(Continued)

the one or more first image areas (A1) where the image (I) is to be located. The method further includes printing by the printing means on the substantially white side of the packaging material using the print data.

20 Claims, 3 Drawing Sheets

(56) References Cited

OTHER PUBLICATIONS

Anonymous, "Suuri maitopurkkikatsaus | Kasper Diem", Jun. 23, 2015 (Jun. 23, 2015), Retrieved from the Internet: URL:http://kasperstromman.com/2015/06/23/suuri-maitopurkkikatsaus/.

* cited by examiner

DIGITAL PRINTING PROCESS AND RESULTING PACKAGING MATERIAL

This application is a national stage filing under 35 U.S.C. 371 of pending International Application No. PCT/EP2020/087485, filed Dec. 21, 2020, which claims priority to Netherlands Patent Application No. 2024561, filed Dec. 23, 2019, the entirety of which applications are incorporated by reference herein.

FIELD OF INVENTION

The field of the invention relates to digital printing processes and systems for printing on packaging materials, in particular for printing on multilayer packaging materials such as a corrugated board or for printing on a substrate or liner for use in such materials.

BACKGROUND

The use of corrugated board in packaging has the benefit of using a recyclable, highly sustainable substrate that is durable and can carry a wide range of weights, thereby making it a very cost-effective packaging material. Brown corrugated board is often used, as this has an ecological look and feel, which is highly appreciated by customers nowadays.

Additionally, corrugated boards are highly customizable by means of applying known printing technologies such as (digital) inkjet printing thereby making them trackable, personalized, economical in short runs, etc. Typically, it is preferred to use water-based inkjet inks instead of solvent-based or UV-based inkjet inks, the reasons being the ecological perspective, recyclability, food safety, etc.

Printing on brown corrugated board has the disadvantage that it requires high opacity coloured inks and/or white inks to create vibrant colours (either opaque or using white underneath) and white images, lines or texts. In inkjet printing, process colour inks are preferably transparent to allow for overlap of primary colours to create secondary colours. White inks require the use of white pigments (typically TiO2) resulting in fast sedimentation due to the density differences between the ink carrier and the pigment. Furthermore, a white inkjet ink requires an additional print station or even multiple additional print stations if the desired opacity has to be reached. Thus inkjet printing on brown corrugated boards suffers from a number of problems.

SUMMARY

The object of embodiments of the invention is to provide a digital printing process allowing printing on packaging materials such as corrugated boards with good results, whilst avoiding or reducing the need for high opacity inks and white inks.

According to a first aspect of the invention there is provided a digital printing process for printing an image including a white area and/or a coloured area on a packaging material. The method comprises selecting a packaging material with a substantially white side having a colour with colour coordinates Lab=(L>70, [−6<a<6], [−6<b<6]), preferably Lab=(L>80, [−5<a<5]; [−5<b<5]), more preferably Lab=(L>90, [−4<a<4], [−4<b<4]) and most preferably Lab=(92,1,0)±7$\Delta E_{76}$. The packaging material may have only one substantially white side or two substantially white sides. The method further comprises preparing print data to be sent to a printing means taking into account that the colour of the side of the packaging material is substantially white, with the aim to avoid or reduce the need for high opacity and/or white inks. For example, when one or more portions of the image to be printed are white, then the print data may be prepared such that those one or more portions are not printed with white ink. The print data represents one or more first image areas representing the image, and one or more second image area representing a packaging look to be printed on the substantially white side of the packaging material, outside the one or more first areas where the image is to be located. In a next step, the printing means prints on the substantially white side of the packaging material using the print data.

It was found that the use of a packaging material with a white side, e.g. a corrugated cardboard with at least one white side, instead of using e.g. standard brown corrugated cardboard, allows using no or significantly less high opacity inks and white inks, whilst obtaining sharp images, as the white or lightly coloured areas of the image do not have to be printed and/or can be printed with modified colours which do not require high opacity inks or white inks. Further, the non-image space is filled with a pattern mimicking a packaging look, such as a typical corrugated brown colour and pattern. Surprisingly, it has been found that the printing of such packaging look on a substantially white side is more sustainable and ecological (improved recyclability) since no or less white or high opacity inks are used. Also, the printing process can be less complex. Indeed, an advantage of printing a packaging look, such as a corrugated texture/pattern, on a substantially white side of a packaging material is the lack of need for white inks to create white effects. Further, the printing press can be less expensive due to no need for white ink print heads and no need for a demanding maintenance system for white inks. Also, the printing process can be more robust and have a higher uptime due to lack of white inks. Especially in water-based inks it is not easy to have the right amount of heavy density whitening agent in an ink in a stable, non-sedimentation-forming way, and non-high density whitening agents have much less opacity. By avoiding the need for such inks, the printing process is improved. Also, in many cases the ink consumption can be lower. Further, when using UV curable inks, white UV inks are harder to cure because UV light may be blocked by colour inks on top (resulting in a higher likelihood of obtaining smelly prints). Also, white UV inks typically require UV light very close to the visible light, resulting in ink instability upon handling. Thus, the advantage of using only colour UV curable inks is that a better overall curing can be obtained, and that the handling of the UV inks is easier. Further, many different packaging looks are possible on the same packaging material, e.g. various eco-look variations, such as from a few speckles to a full brown corrugated look.

The packaging material may be any one of the following: corrugated cardboard, folding cardboard, solid cardboard, or a liner or substrate to be included as an outer layer in a multilayer packaging material, such as corrugated cardboard, folding cardboard, solid cardboard. The substantially white side may be e.g. a substantially white side of a substantially white substrate or liner of a corrugated cardboard, folding cardboard or solid cardboard. For a corrugated cardboard, the corrugated inner substrate may be brown and at least one of the outer substrates may be substantially white. It is noted that the printing may take place on a substrate or liner before it is included in the cardboard material, or the printing may be done on the cardboard material.

Since the designer of the image data intended the design to be printed on brown or coloured board, the design may contain white areas where this is required. Especially under e.g. barcodes, white is typically put to increase the contrast and legibility of the barcode. Also to have better colours in e.g. logos, white is typically included in the design so better colours are achieved. In embodiments of the invention the image data can be automatically modified to emulate the same end result when printed actually on the substantially white side of the packaging material.

The packaging material may be cut before or after printing into packaging blanks. Embodiments of the invention are especially useful for preparing a packaging blank intended to be shaped into a packaging product such as a box, a tray, a display. Particular embodiments are intended for producing food packaging products where it is desirable to avoid the use of e.g. UV curable inks The packaging material may be provided, e.g. coated or laminated, with a substantially white coating or film or sheet material.

Although the invention is particularly advantageous for cardboard materials, it may also be used for flexible packaging materials comprising film, plastic (PP, PE, PVC, PET, PETG, PA, Cellophane (regenerated cellulose), paper, foil, laminates, a thermoplastic aliphatic polyester derived from renewable resources (such as polylactide (PLA)) or the like thereby forming flexible packages such as plastic liners, pouches (e.g. pouches for seeds), seals, sample packs, shrinkage foils or bags.

According to an exemplary embodiment, the print data is prepared such that one or more portions of the image having a colour which is within a predetermined range of the colour of the substantially white side are not included as portions to be printed. In that manner it is avoided that white ink is needed to print the first image area. Preferably, the printing step does not use substantially white ink. Typically, a surface area of the one or more second image areas is at least two times larger than a surface area of the one or more first image areas, preferably at least four times larger.

For example, the print data may be prepared based on image data intended for printing using white ink e.g. on brown corrugated board, and the preparing of the print data may comprise removing portions of the image data having a colour which is the same as the colour of the substantially white side and/or changing the colour of portions of the image data taking into account the colour of the substantially white side.

According to an exemplary embodiment, the print data is prepared based on image data, typically image data intended for printing using white ink, and the preparing includes a raster image processing step, wherein an output of the raster image processing step is modified to include one or more background images having the packaging look on top of which the image data intended for printing using white ink is imposed, in order to obtain the print data. By imposing the original image data on the one or more background images, any white areas of the original image data will knock-out the corresponding areas in the one or more background images, such that those areas are not printed and can take the colour of the substantially white side of the packaging material.

According to another exemplary embodiment, the print data is prepared based on image data, typically image data intended for printing using white ink, and the preparing includes a raster image processing step, wherein the output of the raster image process is merged with one or more background images having the packaging look, where the output of the raster image processing step may contain white areas that knock out the one or more background images, in order to obtain the print data.

Preferably, the raster image processing step includes the translation of a named colour into a CMYK colour representing white. This step is performed before the modifying or the merging step, such that the translated pixels may also cause a knock-out of the one or more background images.

Preferably, the usage of one or more background images is limited to a maximum width and/or length of the printed material.

According to an exemplary embodiment, the process further comprises visualizing the print data, so that the effect on printing on a substantially white side of the packaging material can be inspected. For example, a computer program may visualize the modified output of the raster image process, or the output of the raster image process merged with one or more background images, so that the effect on printing on a substantially white side of the packaging material can be inspected.

In further developed embodiments, the colour of a side of the packaging material may be measured, and this measure may be taken into account when preparing the print data. When the measure indicates that the side of the packaging material is substantially white, then an embodiment of the invention may be used for preparing the print data, and otherwise a standard raster image processing method may be used to prepare the print data. In that manner, neither the designer, nor the printer needs to worry about the settings to be used as the settings can be determined fully automatically.

According to a preferred embodiment, the one or more second image areas represent a packaging look substantially free of substantially white zones. In that manner a real packaging look can be created, giving a consumer the idea that the packaging is made of the "packaging look" material.

According to a preferred embodiment, the packaging look represents a packaging material, preferably a substantially homogeneous packaging material in the sense that the same material impression is given in the entire area where the packaging look is printed. For example, the packaging look may represent any one of the following packaging materials: cardboard, preferably brown cardboard, more preferably of a brown corrugated board; a wood-based packaging material (e.g. packaging look of a wooden case); a plant-based packaging material (e.g. packaging look of a reed basket); a fibre-based material (e.g. jute fibre material); a glass-based material; an aluminium foil.

According to a preferred embodiment, the print data comprises, for the one or more second image areas, photographic or scanned image data, preferably photographic or scanned images of a packaging material, more preferably of a brown corrugated board. By using photographic or scanned image data of a packaging material, the packaging can be given the look of any existing packaging material in a realistic manner.

According to an exemplary embodiment the print data comprises, for the one or more second image areas, print data for printing a substantially brown colour packaging look preferably with colours having CMYK colour values in the following colour range: Lab=$(63,9,23)\pm15\Delta E_{76}$; more preferably Lab=$(63,9,23)\pm12\Delta E_{76}$ and most preferably Lab=$(63,9,23)\pm10\Delta E_{76}$.

According to a preferred embodiment, the printing comprises inkjet printing, preferably inkjet printing using water-based ink. Preferably, the inkjet printing is performed in a single pass-mode. Preferably, the inkjet printing is performed using piezo print heads.

According to a preferred embodiment, the printing of at least the one or more second image areas included in the print data is done using a set of CMYK inks Preferably, the set of CMYK inks is a set of water-based inks. More preferably, the printing of all the print data is done using a set of CMYK inks. An advantage of producing a second image area, e.g. a brown pattern, using the set of CMYK inks is the lack of the need for an extra spot colour station in the printer. In that manner a single pass printer without an extra colour station may be used.

Optionally, the printing of the one or more second image areas included in the print data is done using a dedicated spot colour. This spot colour may be achieved using an ink containing one pigment or multiple pigments. Such a solution may be used when it is desirable to obtain a very sharp second image area as the use of fewer inks implies less chances of misregistration from one ink to another.

According to a preferred embodiment, the preparing of the print data comprises: receiving an image file comprising image data representing the image; changing the image data of said image file taking into account that the colour of the side of the packaging material is substantially white; combining the changed image data with image data for the one or more second image areas to obtain the print data. Alternatively, the image data may be first combined with image data for the one or more second image areas, and next the combined image data may be changed taking into account that the side of the packaging material is substantially white, to obtain the print data.

It is noted that the image data may be changed in the source file, e.g. a portable data format (pdf) file or a postscript (ps) file, or in a raster image file or bitmap as already explained above. In other words, the changes may be made before and/or during and/or after the raster image processing of the source file.

According to an exemplary embodiment, the image to be printed comprises substantially white text and/or figures, and the preparing the print data comprises preparing pixel data representing the image packaging look (L), said pixel data being such that the packaging look is included in areas immediately surrounding non-image areas and such that said non-image areas represent the text and/or figures. In other words, the substantially white text and/or figures are not printed but the one or more second image areas immediately surrounding the text and/or figures are printed using the packaging look pattern, such that the text and/or figures are delimited by the printed one or more second image areas and hence distinguishable.

According to an exemplary embodiment, the method is intended for preparing multiple packaging blanks, and the printing step is repeated multiple times. The packaging material may then be cut before or after the printing steps to form the multiple packaging blanks.

According to an exemplary embodiment, the same image is printed on the multiple packaging blanks, and the step of preparing print data comprises preparing first print data for a first packaging blank and second print data for a second packaging blank, such that the one or more second image area of the first print data are different from the one or more second image areas of the second print data. In other words the packaging look may be changed, e.g. modified slightly, e.g. to make the "packaging look" more real. Optionally, the different one or more second image areas may be obtained by rotating, mirroring or scaling a background image representing the packaging look and/or by varying between slightly different background images. In the prior art, when using standard brown corrugated cardboard, two packaging products (e.g. boxes) are never identical, and this may be imitated by using different image data for printing the one or more second image areas of subsequent packaging blanks. The different image data may be simply obtained by rotating or mirroring image data representing a packaging look.

As mentioned above, the packaging material may be cut before or after the printing of the first and second print data to form the first and second packaging blank.

Note also that it is possible to print different images on subsequent packaging blanks. More generally, the print data for printing subsequent blanks may be different or the same, and when the print data is different the one or more first image areas and/or the one or more second image areas may be different. In that manner packaging products can be adjusted in a very flexible way.

According to an exemplary embodiment, the method further comprises the step of folding and optionally gluing the multiple packaging blanks into multiple packaging products, such as boxes, trays, displays, etc.

According to an exemplary embodiment, the print data may be prepared such that an entire outer surface of the packaging product to be formed is provided with the packaging look with the exception of the one or more first image areas where the image is to be located. It is noted that flaps or edges which are used e.g. for gluing the packaging product and which are not visible at an outer surface do not have to be provided with the packaging look.

According to an exemplary embodiment, prior to the step of printing, a primer is applied on the packaging material. The primer may be a reaction liquid suitable to enhance the colour strength. The primer may be applied on the entire substantially white side or on certain areas thereof which need to be printed. This primer may be fully dry or semi-dry prior to printing or may still be wet (wet-in-wet printing).

According to an exemplary embodiment, after the step of printing, a varnish is applied on the packaging material, e.g. locally on the printed area or on the entire side.

According to another aspect of the invention, there is provided a computer program or a digital storage medium or a computer program product comprising or storing computer-executable instructions to perform the preparing and/or visualizing step of the process of any one of the previous embodiments, when the program is run on a computer.

According to yet another aspect of the invention there is provided a printed packaging material obtained according to the process of any one of the previous embodiments, and a packaging product shaped using such packaging material, e.g. into a box, a tray, a display. Optionally, the entire outer surface of such packaging product may be provided with the packaging look with the exception of the one or more first image areas where the image is located.

BRIEF DESCRIPTION OF THE FIGURES

The accompanying drawings are used to illustrate presently preferred non-limiting exemplary embodiments of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1A:
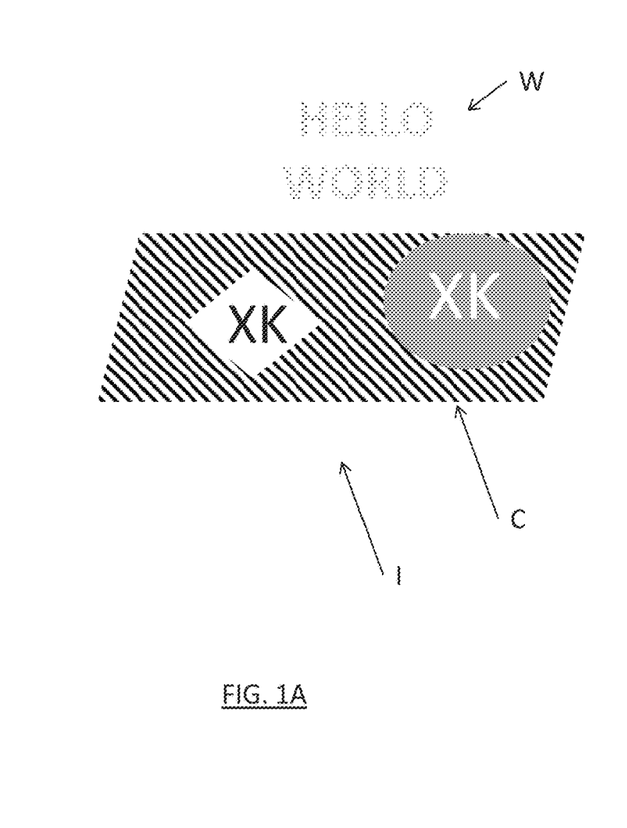
FIGS. 1A-1D illustrates schematically a digital printing process according to an exemplary embodiment.
Figure 1B:
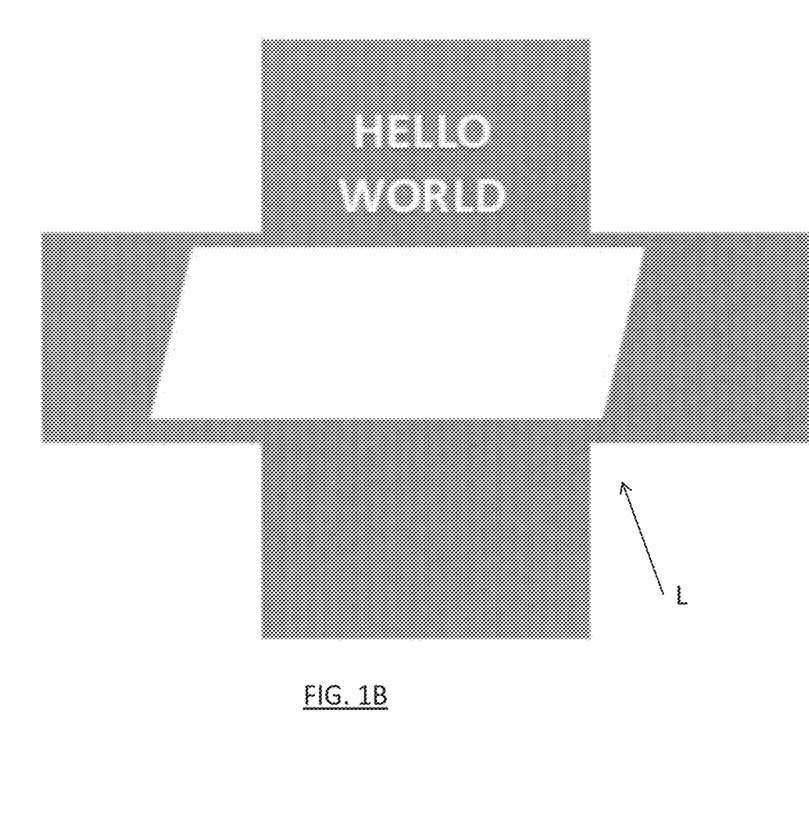
Figure 1C:
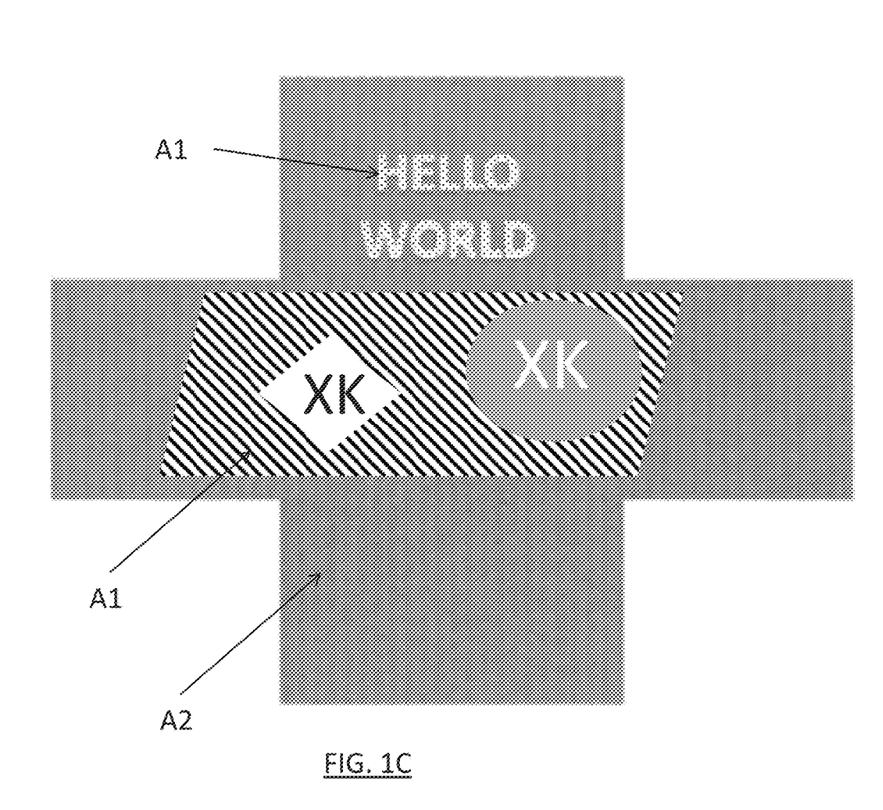

FIGS. 1A-1C illustrate a digital printing process for printing an image I including a white area W and a coloured area C on a packaging material. The image I to be printed on the packaging material is shown in FIG. 1A. This may be an image I which is included in an image file intended for printing using white ink e.g. on a standard brown packaging material. In the illustrated example, the image I comprises multiple image areas: substantially white text areas "HELLO WORLD", and a coloured image area C containing coloured patterns and/or text and/or logos. The substantially white text areas "HELLO WORLD" may be e.g. in white or in a light colour.

According to an exemplary embodiment, the method comprises selecting a packaging material with a substantially white side preferably having a colour with colour coordinates Lab=(L>70, [−6<a<6], [−6<b<6]), preferably Lab=(L>80, [−5<a<5]; [−5<b<5]), more preferably Lab= (L>90, [−4<a<4], [−4<b<4]) and most preferably Lab=(92, 1,0)±7$\Delta E_{76}$, and for example white. For example, a corrugated cardboard with one "brown" side and one white side may be selected. The term "substantially white side" implies here that one entire side of the packaging material is substantially white.

Based on the received image data containing the image I shown in FIG. 1A, and taking into account that the colour of the side of the packaging material is substantially white, print data is prepared. The prepared print data represents:
- multiple first image areas A1 representing the image I, see also the printed packaging blank shown in FIG. 1C;
- a second image area A2 representing a packaging look L, to be printed on the substantially white side of the packaging material, outside the one or more first image areas A1 where the image I is to be located, see FIG. 1B which shows the packaging look L without the image I and FIG. 1C which shows the printed packaging blank.

Figure 1D:
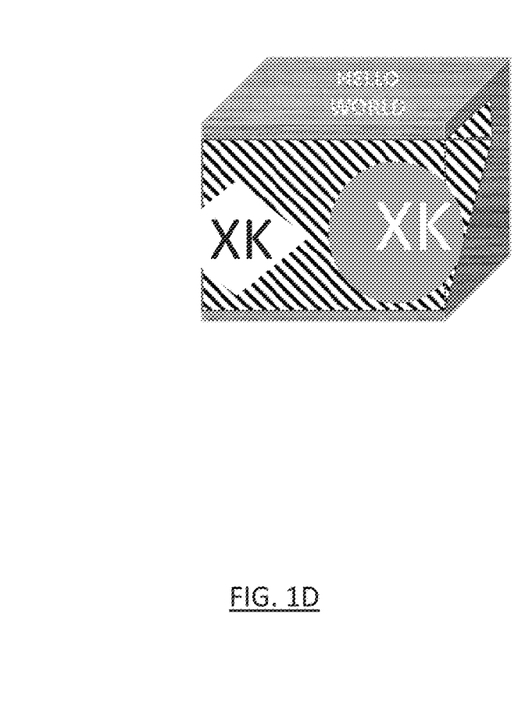

After the preparing of the print data, the first and second image areas A1, A2 are printed using the print data, resulting in a printed packaging blank as illustrated in FIG. 1C. Next the printed packaging blank may be folded into a packaging product such as a box, see FIG. 1D.

Since the designer of the original image data intended the design to be printed on brown or coloured board, the design may contain white areas where this is required, originally intended to be printed using white ink. Especially under e.g. barcodes white is typically put to increase the contrast and legibility of the barcode. Also to have better colours in e.g. logos, white is typically included in the design so better colours are achieved.

The fact that in embodiments of the invention, the design is printed on a substantially white side of the packaging material should ideally not require the designer to make a change to the design file since the printer and the designer are typically different people, even in different companies, and the designer may not know that the design will be printed on a white side. One of the steps in translating the design file into a file that can be printed is known as the raster image process or RIP.

To automate the modifications to be done to the original image data to have the same effects as intended on the brown or coloured board but now printing on the substantially white side of the packaging material, the output of the RIP can be modified by putting first one or more background image representing the packaging look, and putting the original image data on top of that one or more background images. White areas that are thus put on top of the one or more background images will result in the background image not being present where white areas are put, or stated different the background images will be knocked-out where white areas are put, resulting in areas which do not have to be printed. The result is that e.g. barcodes with a white background will not get a coloured background and will look as if white ink has been printed below the actual bar code. This process of not using background image data where another image is put on top, is known as knock out.

The modification of the original image data by including a background image as the "bottom" of the print data, can be done during the RIP or after the RIP, for example as a merging of output data of the RIP with the one or background images while printing.

The RIP step may further include a translation of a named colour, e.g. named "WHITE INK", into a CMYK colour representing white, where each CMYK % is 0. For example, the original image data may include multiple layers, wherein one layer is containing pixels of a named colour, e.g. "WHITE INK". In that case, a portion of the pixels of this layer may be translated into CMYK 0000 (e.g. an area of the layer for which other layers do not contain data to be printed), in order to obtain a knock-out effect when combining the data with one or more background images.

The image data may be further modified to limit the usage of the background image to a maximum width and/or length on the sheet so that no ink is wasted to print background images on places that will be cut away later when making e.g. boxes.

A computer program can be made where the modified output data of the RIP, or the merging of the output data of the RIP with the one or more background images is visualized, so that the expected print output can be visualized before the actual printing is done.

The packaging look L may be e.g. a standard brown packaging look for which photographic or scanned image data of a packaging material, more preferably of a brown corrugated board, is used.

The print data may be prepared such that one or more portions of the image I having a colour which is within a predetermined range of the colour of the substantially white side are not included as portions to be printed. For example, the substantially white text W of the image I may be included in the print data as non-image pixels (i.e. pixels which do not need to be printed), surrounded by pixels of the second image area A2. In an example, the print data is prepared based on image data intended for printing on brown corrugated board, i.e. where the pixels of the white text are included as white pixels to be printed in white, and the preparing of the print data comprises changing the white pixels into non-image pixels (i.e. pixels which do not need to be printed).

As mentioned above, a corrugated cardboard with one "brown" side and one white side may be selected as the packaging material. However, it is also possible to select a packaging material with two white sides. This allows creating e.g. an eco-look on the outside in combination with a premium white look on the inside. Optionally, both sides may be printed sides.

It was found that the use of a corrugated cardboard with at least one white side, instead of using e.g. standard brown corrugated cardboard, allows using no or significantly less high opacity inks and white inks, whilst obtaining sharp image areas A1, as the white or lightly coloured areas W of the image do not have to be printed and/or can be printed with adapted colours which do not require high opacity inks or white inks. Further, the one or more second image areas A2 can be given any desired packaging look, such as a typical corrugated brown colour and pattern. Further, many different packaging looks are possible on the same packaging material. For example, a cheap quality corrugated cardboard material with a white side can have a packaging look of a thicker flute cardboard to create a more expensive look, by printing in the one or more second image areas A2 photographic or scanned image data of a thicker flute cardboard.

Figure 2:
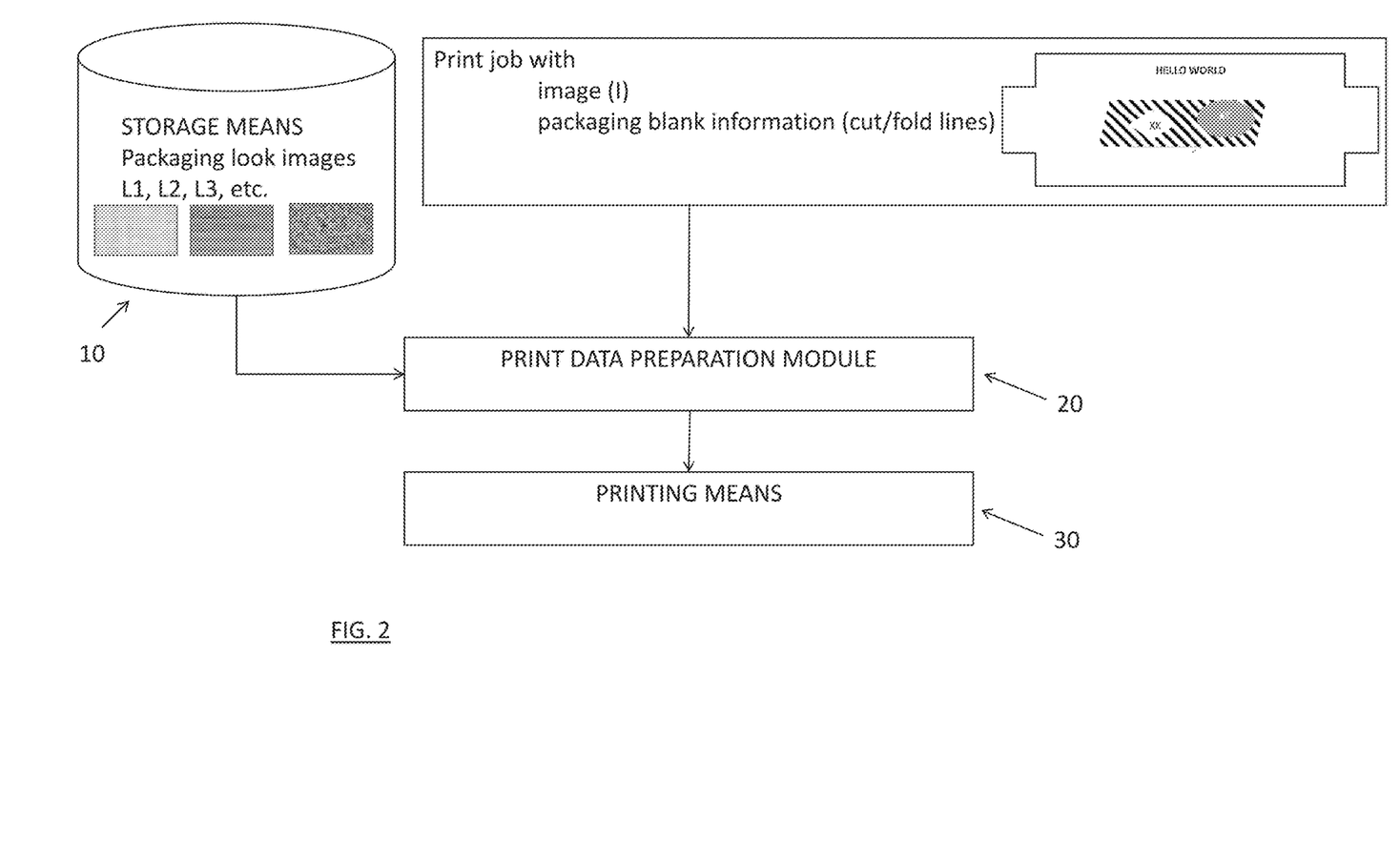
FIG. 2 is a block diagram of an exemplary embodiment of a digital printing system according to an exemplary embodiment.

FIG. 2 illustrates in more detail an exemplary embodiment of a digital printing system comprising a storage means 10, a print data preparation module 20 for preparing the print data, and a printing means 30. In the example of FIG. 2, it is assumed that a standard print job is received containing source image data for printing an image I, e.g. an image as illustrated in FIG. 1A and information about the packaging blank on which the image I is to be printed, such as cut and/or fold lines. The received print job may contain e.g. a pdf or ps file.

Multiple different packaging look images L1, L2, L3 are stored in a storage means 10, and a user interface may allow a user to choose from multiple packaging look images L1, L2, L3 for use in a second image area A2.

The step of preparing the print data may comprise interpreting the source image data of the print job. Optionally, indications, such as cutting lines or cutting crosses, associated with the image data of the print job may be used to determine the one or more first image areas and the one or more second image areas. Alternatively or in addition, an operator may be provided with
- a user interface configured to allow a user to indicate the one or more first image areas A1 and/or the one or more second image areas A2; and/or
- a user interface configured to suggest, based on the received print job, suitable first and/or second image areas A1, A2 and allowing the user to modify and/or to confirm the suggested first and/or second image areas A1, A2.

In other words, the step of preparing of the print data may be fully automated without requiring user input, or may be partially automated allowing a user to indicate and/or to check the first and/or second image areas A1, A2.

The source image data may be modified taking into account the colour of the white side, and the one or more second image areas A2 may be added to the source file, whereupon the modified image file may be raster image processed to obtain a raster image processed file (RIP file) including the one or more first and second image areas A1, A2. Alternatively, the source image data may be first subject to a Raster Image Processing, RIP, process, whereupon the adding of the one or more second image areas A2 and the modifying of the one or more first image areas is done in the raster image processed file. Also, the one or more second image areas A2 may be added during the RIP. For more details about some possible implementations reference is made to the embodiments described above.

After the raster image processing step, the RIP file or the modified RIP file may be screened to generate the print data which is sent to the printing means 30.

The printing means 30 may be inkjet printing means, comprising e.g. piezo print heads. Preferably, the inkjet printing by the printing means 30 is performed in a single pass-mode. The printing of the print data may be done using a set of water-based CMYK inks. The printing of the one or more second image areas A2 included in the print data may be done with the same CMYK inks as the printing of the one or more first image areas A1. Alternatively, the printing of the one or more second image areas A2 included in the print data is done using a dedicated spot colour, e.g. a brown colour.

Typically, the printing step by the printing means 30 is repeated multiple times, and the packaging material may be cut before or after the printing steps to form the multiple packaging blanks. The one or more first image areas A1 may be the same or different in subsequent printing steps. Also, the one or more second image areas A2 may be the same or different in subsequent printing steps.

A person of skill in the art would readily recognize that steps of various above-described processes can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A digital printing process for printing an image including a white area and/or a coloured area on a packaging material, said method comprising the steps of:
  selecting a packaging material with a substantially white side having a colour with colour coordinates Lab= (L>70, [−6<a<6], [−6<b<6]), preferably Lab=(L>80, [−5<a<5]; [−5<b<5]), more preferably Lab=(L>90, [−4<a<4], [−4<b<4]) and most preferably Lab=(92,1, 0)±7$\Delta E_{76}$;
  preparing print data to be sent to a printing means taking into account that the side of the packaging material is substantially white, said print data representing:
    one or more first image areas representing the image, and
    one or more second image areas representing a packaging look, to be printed on the substantially white side of the packaging material, outside the one or more first image areas where the image is to be located; and
  printing by the printing means on the substantially white side of the packaging material using the print data.

2. The digital printing process of claim 1, wherein the packaging material is provided with a substantially white coating or film or sheet material; and/or wherein the packaging material has two substantially white sides; and/or wherein the substantially white side is a substantially white side of a substantially white substrate or liner of a corrugated cardboard, folding cardboard or solid cardboard.

3. The digital printing process of claim 1, wherein the print data is prepared such that one or more portions of the image having a color which is within a predetermined range of the colour of the substantially white side are not included as portions to be printed.

4. The digital printing process of claim 1, wherein the printing step does not use substantially white ink; and wherein the steps are performed such that the resulting printed packaging material does not contain printed white ink.

5. The digital printing process of claim 1, wherein the print data is prepared based on image data intended for printing using white ink, and wherein the preparing of the print data comprises removing portions of the image data having a color which is the same as the color of the substantially white side and/or changing the color of portions of the image data taking into account that the side is substantially white.

6. The digital printing process of claim 1, wherein the print data is prepared based on original image data typically intended for printing using white ink, and wherein the preparing includes a raster image processing step, wherein an output of the raster image processing step is modified to include one or more background images having the packaging look on top of which the original image data is imposed, such that background image areas are knocked-out by white areas, in order to obtain the print data; and wherein preferably the raster image processing step includes a step of translating of a named color in the original image data into a CMYK color representing white, which step is being performed before the modifying or the merging step.

7. The digital printing process of claim 1, wherein the print data is prepared based on original image data typically intended for printing using white ink, and wherein the preparing includes a raster image processing step, wherein the output of the raster image process is merged with one or more background images having the packaging look, where the output of the raster image processing step may contain white areas that knock out corresponding areas of the one or more background images during the merging, in order to obtain the print data; and wherein preferably the raster image processing step includes a step of translating of a named color in the original image data into a CMYK color representing white, which step is being performed before the modifying or the merging step.

8. The digital printing process of claim 1, wherein the one or more second image areas represent a packaging look substantially free of substantially white zones.

9. The digital printing process of claim 1, wherein the print data comprises, for the one or more second image areas, photographic or scanned image data, preferably photographic or scanned image data of a packaging material, more preferably of a brown corrugated board or folding cardboard.

10. The digital printing process of claim 1, wherein the print data comprises, for the one or more second image areas, print data for printing a substantially brown colour packaging look with colours having preferably colour coordinates in the following colour range: Lab=(63,9,23) $\pm 15\Delta E_{76}$; more preferably Lab=(63,9,23)$\pm 12\Delta E_{76}$ and most preferably Lab=(63,9,23)$\pm 10\Delta E_{76}$.

11. The digital printing process of claim 1, wherein the printing comprises inkjet printing preferably inkjet printing using water-based ink; wherein optionally the inkjet printing is performed in a single pass-mode, wherein optionally the inkjet printing is performed using piezo print heads.

12. The digital printing process of claim 1, wherein the printing of the one or more second image areas included in the print data is done using a dedicated spot colour.

13. The digital printing process of claim 1, wherein preparing the print data comprises:
receiving an image file comprising image data representing the image;
changing said image data of said image file taking into account that the colour of the side of the packaging material is substantially white; and
combining the changed image data with image data for the one or more second image areas to obtain the print data.

14. The digital printing process of claim 1, wherein the image to be printed comprises substantially white text and/or figures, and wherein preparing the print data comprises preparing pixel data representing the image packaging look, said pixel data being such that the packaging look is included in areas immediately surrounding non-image areas and such that said non-image areas represent the text and/or figures.

15. The digital printing process of claim 1 for preparing multiple packaging blanks, wherein the printing step is repeated multiple times, and wherein the packaging material is cut before or after the printing steps to form the multiple packaging blanks.

16. The digital printing process of claim 15, for printing a same image on the multiple packaging blanks cut out of the same packaging material, wherein the step of preparing print data comprises preparing first print data for a first packaging blank and second print data for a second packaging blank, such that the one or more second image areas of the first print data are different from the one or more second image areas of the second print data, wherein the packaging material is cut before or after the printing of the first and second print data to form the first and second packaging blank, wherein optionally the different one or more second image areas may be obtained by rotating, mirroring or scaling a background image representing the packaging look and/or by varying between slightly different background images.

17. The digital printing process of claim 15, wherein the multiple packaging blanks are folded and optionally glued to obtain multiple packaging products; and wherein preferably the print data is prepared such that an entire outer surface of the packaging product to be formed is provided with the packaging look with the exception of the one or more first image areas where the image is to be located.

18. A non-transitory computer readable medium comprising computer-executable instructions to perform the process of claim 1, when run on a computer.

19. A printed packaging material obtained according to the process of claim 1, wherein preferably the packaging look is substantially free of substantially white zones.

20. A packaging product shaped using the packaging material of claim 19; wherein preferably the entire outer surface is provided with the packaging look with the exception of the one or more first image areas where the image is located.

* * * * *